(12) United States Patent
Geary et al.

(10) Patent No.: US 9,647,325 B2
(45) Date of Patent: May 9, 2017

(54) FLEXIBLE ARTIFICIAL IMPEDANCE SURFACE ANTENNAS FOR AUTOMOTIVE RADAR SENSORS

(71) Applicant: GM GLOBAL TECHNOLOGY OPERATIONS LLC, Detroit, MI (US)

(72) Inventors: Kevin Geary, Santa Monica, CA (US); Joseph S. Colburn, Malibu, CA (US); Daniel J. Gregoire, Thousand Oaks, CA (US); Hooman Kazemi, Thousand Oaks, CA (US); Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 161 days.

(21) Appl. No.: 14/473,547

(22) Filed: Aug. 29, 2014

(65) Prior Publication Data

US 2016/0064806 A1    Mar. 3, 2016

(51) Int. Cl.
| | |
|---|---|
| *H01Q 1/32* | (2006.01) |
| *G01S 7/03* | (2006.01) |
| *G01S 13/93* | (2006.01) |
| *H01Q 1/40* | (2006.01) |
| *H01Q 21/06* | (2006.01) |
| *H01Q 21/20* | (2006.01) |

(52) U.S. Cl.
CPC ............ *H01Q 1/3233* (2013.01); *G01S 7/03* (2013.01); *G01S 13/931* (2013.01); *H01Q 1/40* (2013.01); *H01Q 21/065* (2013.01); *H01Q 21/20* (2013.01); *G01S 2013/9371* (2013.01); *G01S 2013/9375* (2013.01); *G01S 2013/9378* (2013.01); *G01S 2013/9392* (2013.01); *G01S 2013/9396* (2013.01)

(58) Field of Classification Search
CPC ....................................................... H01Q 13/28
USPC ........................................................ 343/713
See application file for complete search history.

(56) References Cited

PUBLICATIONS

Patel, Amit M. "A Printed Leaky-Wave Antenna Based on a Sinusoidally-Modulated Reactance Surface" IEEE Transactions on Antennas and Propagation, vol. 59, No. 6, Jun. 2011, pp. 2087-2096.
Fong, Bryan H. "Scalar and Tensor Holographic Artificial Impedance Surfaces" IEEE Transactions on Antennas and Propagation, vol. 58, No. 10, Oct. 2010, pp. 3212-3221.

(Continued)

*Primary Examiner* — Graham Smith
(74) *Attorney, Agent, or Firm* — John A. Miller; Miller IP Group, PLC

(57) ABSTRACT

A flexible, printable antenna for automotive radar. The antenna can be printed onto a thin, flexible substrate, and thus can be bent to conform to a vehicle body surface with compound curvature. The antenna can be mounted to the interior of a body surface such as a bumper fascia, where it cannot be seen but can transmit radar signals afield. The antenna can also be mounted to and blended into the exterior of an inconspicuous body surface, or can be made transparent and mounted to the interior or exterior of a glass surface. The antenna includes an artificial impedance surface which is tailored based on the three-dimensional shape of the surface to which the antenna is mounted and the desired radar wave pattern. The antenna can be used for automotive collision avoidance applications using 22-29 GHz or 76-81 GHz radar, and has a large aperture to support high angular resolution of radar data.

19 Claims, 6 Drawing Sheets

(56) References Cited

PUBLICATIONS

Colburn, J. S. "Adaptive Artificial Impedance Surface Conformal Antennas" IEEE, 2009, 4 pgs.
Yuan, Hao-Chih, "7.8-GHz Flexible Thin-Film Transistors on a Low-Temperature Plastic Substrate" Journal of Applied Physics, vol. 102, Issue 3, Aug. 2007, pp. 034501-1-034501-4.
Ahn, Jong-Hyun, "Bendable integrated circuits on plastic substrates by use of printed ribbons of single-crystalline silicon" Applied Physics Letters 90, 2007, pp. 213501-1-213501-3.
Sun, Yugang, "Gigahertz operation in flexible transistors on plastic substrates" Applied Physics Letters 88, 2006, pp. 183509-1-183509-3.
Sievenpiper, Dan, "Holographic Artificial Impedance Surfaces for Conformal Antennas" HRL Laboratories LLC. 2005, 10 pgs.
Gregoire, D. J. "Artificial Impedance Surface Antennas" HRL Laboratories LLC. Distribution A: Unlimited Public Release, 12 pgs.
Gregoire, D. J. "Artificial Impedance Surface Antenna Design and Simulation" HRL Laboratories LLC. 14 pgs.

FLEXIBLE ARTIFICIAL IMPEDANCE SURFACE ANTENNAS FOR AUTOMOTIVE RADAR SENSORS

BACKGROUND OF THE INVENTION

Field of the Invention

This invention relates generally to an improved automotive radar antenna design and, more particularly, to a flexible, printable radar antenna design with an artificial impedance surface, where the antenna has an aperture area large enough to dramatically improve radar angular resolution, and the antenna is flexible enough to be mountable on an inside or outside surface of a vehicle bumper, body panel, glass or other surface.

Description of the Related Art

Radar systems onboard vehicles have become very common, as driver assistance systems such as lane departure warning and collision warning/avoidance have gained in popularity. Until now, the packaging of radar sensors on vehicles has been problematic, both in terms of the cost of producing the sensors and assembling them into the vehicle, and in terms of the aesthetics of the vehicle.

Traditional radar sensors are three-dimensional prismatic objects which are produced by a sensor manufacturer, including an outer case, internal components, an aperture, weather seals, etc. Such a radar sensor must then be incorporated into a vehicle during final vehicle assembly, often including using brackets or housings to hold the sensor in place, providing openings in bumper fascias or other surfaces for the radar sensor aperture, and the associated handling and alignment process steps. Both the manufacture of the traditional radar sensor and its assembly into a vehicle add cost to the vehicle.

Furthermore, there is an undesirable aesthetic effect in providing openings in bumper fascias or other vehicle body surfaces for the radar sensor aperture. Vehicle styling designers and customers would much prefer not to have these holes in vehicle body surfaces.

Until now, there has been no way to avoid the cost and negative aesthetics of multiple bulky radar sensors on a vehicle without giving up radar signal quality.

SUMMARY OF THE INVENTION

In accordance with the teachings of the present invention, a flexible, printable antenna for automotive radar applications is disclosed. The antenna can be printed onto a thin, flexible substrate, and thus can be bent to conform to a vehicle body surface with compound curvature. The antenna can be mounted to the interior of a body surface such as a bumper fascia, where it cannot be seen but can transmit radar signals afield. The antenna can also be mounted to the exterior of an inconspicuous body surface and blended into the surface, and can even be made transparent and mounted to the interior or exterior of a glass surface. The antenna includes an artificial impedance surface which is tailored based on the three-dimensional shape of the surface to which the antenna is mounted and the desired radar wave pattern. The antenna can be used for automotive collision avoidance applications using 22-29 GHz and/or 76-81 GHz radar, and has a large aperture to support high angular resolution of radar data.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a flexible artificial impedance surface antenna for automotive radar sensors is merely exemplary in nature, and is in no way intended to limit the invention or its applications or uses.

Figure 1:
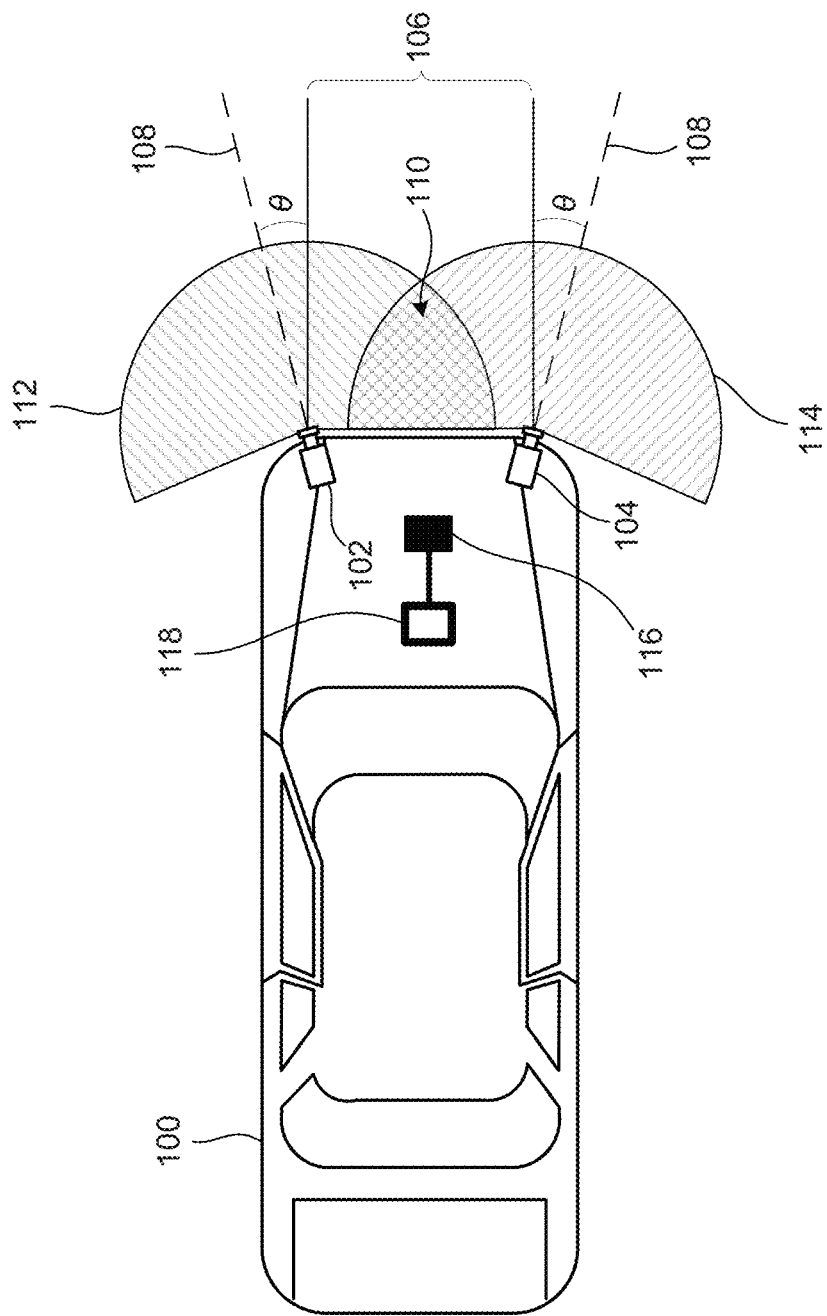
FIG. 1 is a top view of a vehicle including frontal radar sensors which can be used for object detection.

Radar systems onboard vehicles have become very common, as driver assistance systems such as adaptive cruise control and collision warning/avoidance have gained in popularity. FIG. 1 is a top view of a vehicle 100 including frontal radar sensors which can be used for object detection. The vehicle 100 includes a pair of radar sensors 102 and 104, typically positioned behind the grill or in the front bumper of the vehicle 100. The first (or left) radar sensor 102 is spaced apart by a horizontal or lateral distance 106 from the second (or right) radar sensor 104. The distance 106 will vary depending upon the make and model of the vehicle 100, but in some embodiments may be approximately one meter.

The sensors 102 and 104 have an aperture axis 108 that is offset from the forward direction of the vehicle by an angle θ. The angle θ which is employed may vary depending upon the make and model of the vehicle 100, but in some embodiments is approximately 10°. Whatever orientation is selected for the sensors 102 and 104, each sensor covers an ultra-wide field to provide coverage that partially overlaps at an area 110. The coverage area of the sensor 102 is represented by a sector 112, and the coverage area of the sensor 104 is represented by a sector 114. In order to deliver effective collision avoidance and adaptive cruise control functions, the sectors 112 and 114 must provide full frontal radar coverage for the vehicle 100.

The radar returns from the sensors 102 and 104 are received by a radar module 116, which communicates with a processor 118. The processor 118 is a computing device including at least a microprocessor and a memory module, of any type commonly used in vehicles. The processor 118 may be a general purpose device which also performs other computing functions, or the processor 118 may be a custom design which is configured specifically for object detection and associated functions based on the data from the radar module 116.

The packaging of the radar sensors 102 and 104 on the vehicle 100 has typically been problematic, both in terms of the cost of producing the sensors 102 and 104 and assembling them into the vehicle 100, and in terms of the aesthetics of the vehicle 100. This is because the sensors 102 and 104 have typically been constructed with a physical aperture, and electronic circuitry contained in an enclosed housing. The physical size of the housing makes it difficult to package in the vehicle 100, given space limitations behind the fascia. The need for a physical opening in an exterior surface of the vehicle 100 to accommodate the aperture can also create both cost and aesthetic issues. However, by using a flat, flexible, artificial impedance surface antenna, radar sensors can be placed in many new locations on the vehicle 100.

Figure 2:
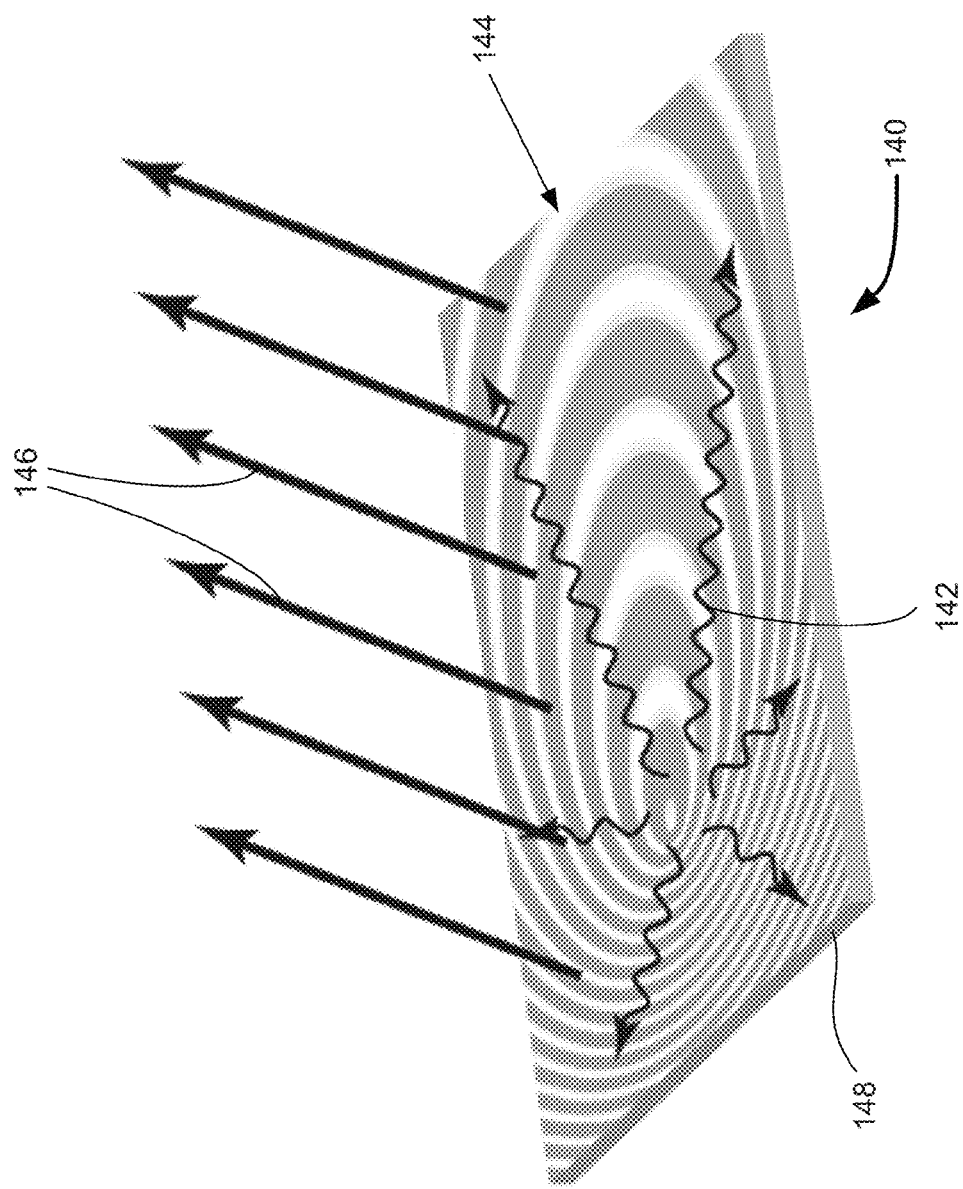
FIG. 2 is a schematic diagram of an artificial impedance surface antenna which could be used on the vehicle of FIG. 1.

FIG. 2 is a schematic diagram of an artificial impedance surface antenna 140 which could be used on the vehicle 100. The artificial impedance surface antenna 140 is a low-cost, flexible, conformal automotive radar antenna design for object detection which can be used for both dedicated automotive frequencies of 22-29 GHz and 76-81 GHz. The artificial impedance surface (AIS) antenna 140 leverages novel printable electronics technology which is capable of operating at the high frequencies indicated. The AIS antenna 140 is low in cost compared to current state of the art radar sensor antenna designs. Furthermore, the AIS antenna 140 is flexible and conformal, and can be mounted on a vehicle in many locations not previously available for mounting radar sensors—such as fascia, door panels, hood, and trunk lid.

The AIS antenna 140 operates by launching a set of surface waves 142 across an artificial impedance surface (AIS) 144, whose impedance is spatially modulated according to a function that matches the phase fronts between the surface waves 142 on the AIS 144 and a desired far-field radiation pattern 146. The AIS antenna 140 radiates the far-field radiation pattern 146 by leaking the surface waves 142 from the AIS 144, where the impedance of the AIS 144 is modulated to produce a preferred radiation pattern and polarization of the far-field radiation pattern 146. The AIS antenna 140 is fabricated on a thin, flexible substrate 148, and can be conformally applied to a variety of body panels onboard the vehicle 100.

Figure 4:
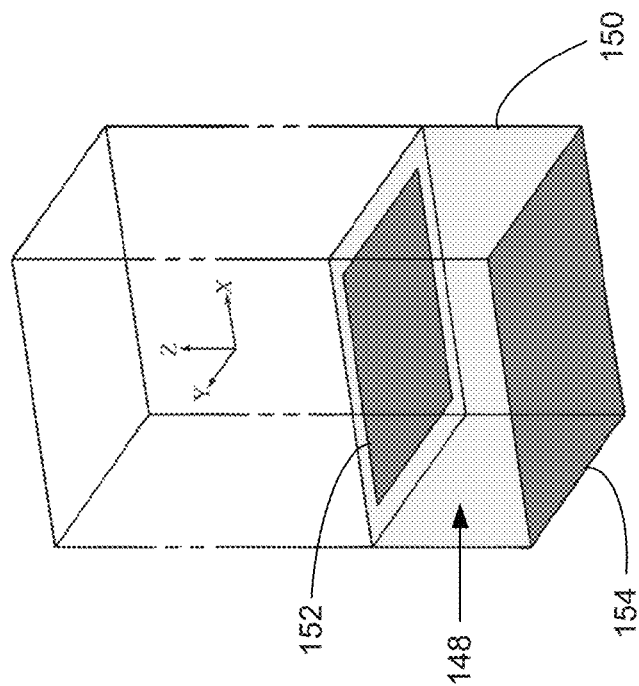
FIG. 4 is a perspective view illustration of a single unit cell of the substrate from the artificial impedance surface antenna shown in FIG. 2.
Figure 3:
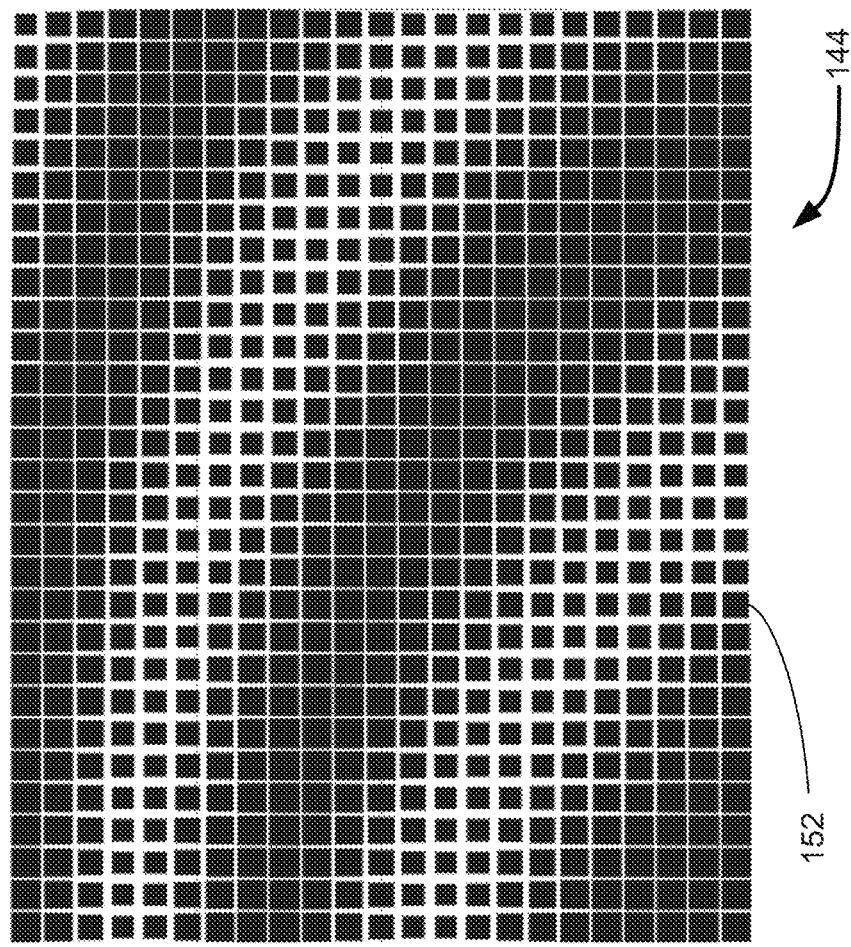
FIG. 3 is an illustration of how the artificial impedance surface of the antenna shown in FIG. 2 can be created by printing a matrix of metallic patches on a substrate.

FIG. 3 is an illustration of how the AIS 144 can be created by printing a matrix of metallic patches on the substrate 148, and FIG. 4 is a perspective view illustration of a single unit cell of the substrate 148 including a portion of the AIS 144. The AIS 144 consists of a pattern of conductive patches 152 of varying size covering a grounded dielectric layer 150 of the substrate 148. The patches 152 are small compared to the electromagnetic wavelength of the surface waves 142, and their scattering properties can be described in terms of their effective surface impedance. High impedance regions have small gaps between the patches 152 and are darker in appearance as seen in FIGS. 2 and 3. By varying the size and shape of the patches 152, the surface impedance of the AIS 144 can be controlled as a function of position and direction. In one embodiment, the unit cell size is fixed at 3 mm, and the gaps between the patches 152 vary between 0.2 mm and 1 mm. A unit cell of the substrate 148—including the dielectric layer 150, a ground plane 154, and one of the patches 152—can be seen in FIG. 4. The volume above the patch 152 shown in FIG. 4 is used in electromagnetic simulations of the radiation pattern 146 resulting from the AIS 144.

Alternate shapes and designs are possible for the patches 152, other than the squares shown in FIGS. 3 and 4. The patches 152 can be squares which are each broken by a small slot, where the position and orientation of the slot varies by location in the grid, thus providing more flexibility in configuring the radiation pattern. The patches 152 can also be other shapes, not necessarily regular polygons.

Figure 5:
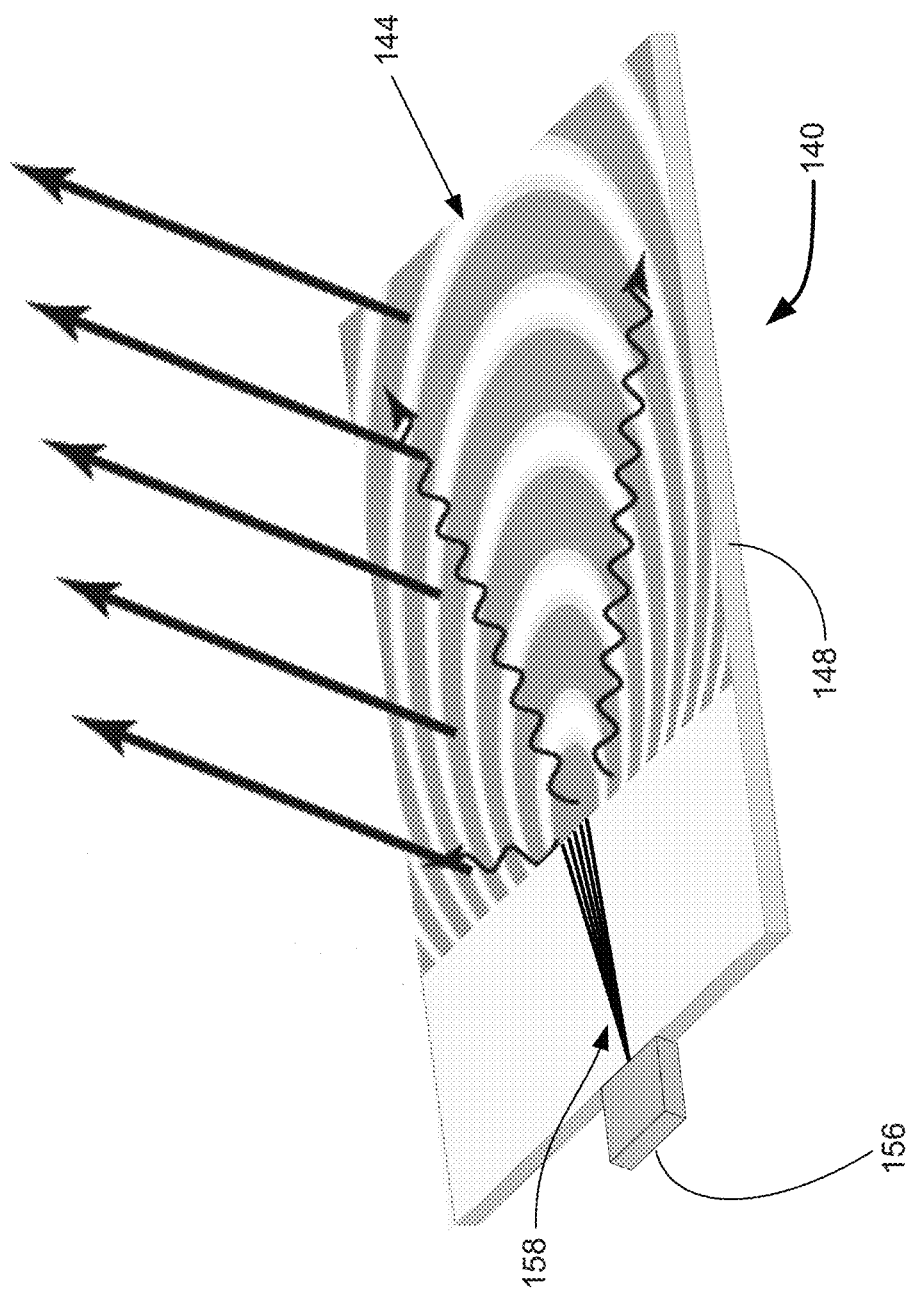
FIG. 5 is an illustration of the complete artificial impedance surface antenna for the first construction embodiment of FIG. 4.

FIG. 5 is an illustration of the complete AIS antenna 140 for the first construction embodiment of FIG. 4. The AIS 144 can be printed on the upper surface of the substrate 148 using known electronics printing techniques. The AIS 144 can alternately be etched from a metallic sheet coating the upper surface of the substrate 148. An RF electronics module or semiconductor chip 156 is attached to the AIS antenna 140, where the attachment may be via a coaxial connector (not shown). The chip 156 is an active component which handles antenna functions such as signal amplification, phase shifting and switching. The chip 156 is electrically coupled to a set of conductive strips known as a surface-wave feed 158, which feed the radar signals to and from the AIS 144. The surface-wave feed 158 can also be printed onto the substrate 148. The ground plane 154, shown in FIG. 4, is on the underside of the substrate 148 and is not seen in FIG. 5.

Figure 6:
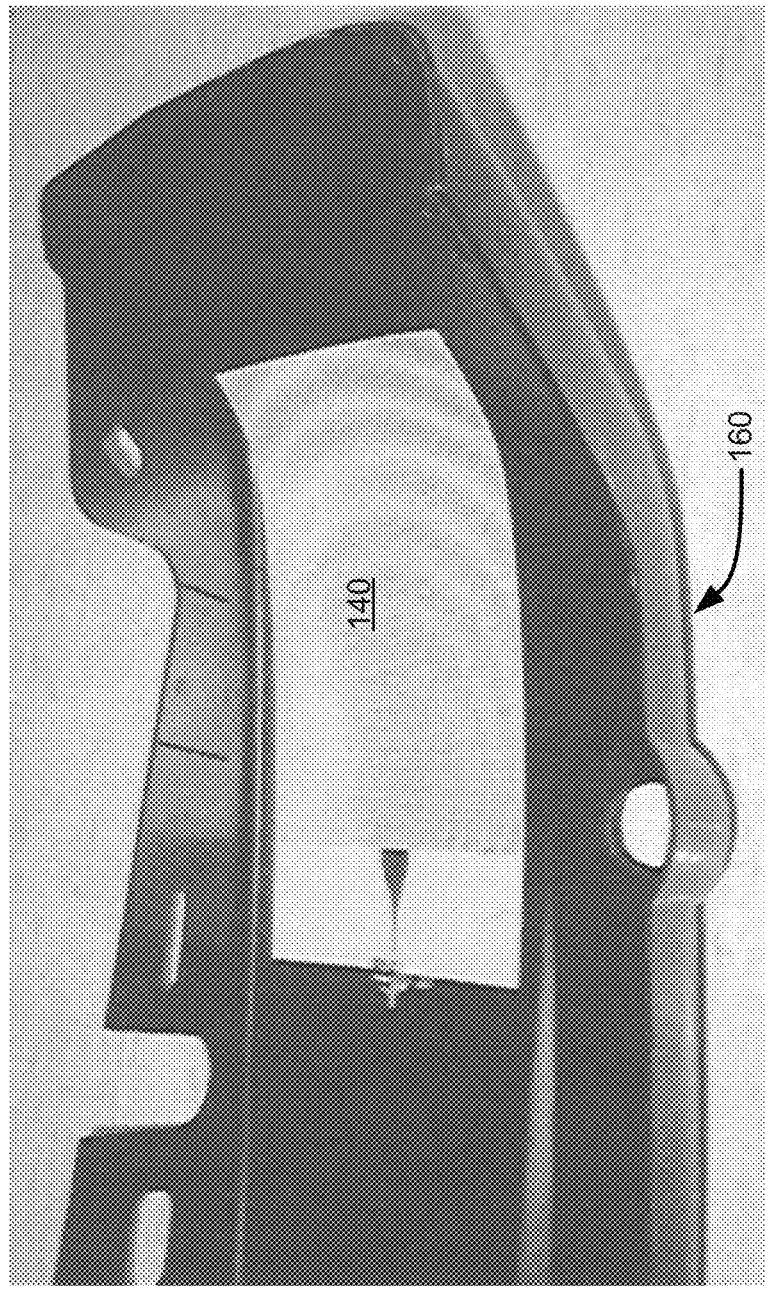
FIG. 6 is an image of an artificial impedance surface antenna mounted to the inside surface of a bumper fascia.

As mentioned above, the substrate 148 can be thin and flexible. In one embodiment, the substrate 148 is a ceramic-filled polytetrafluoroethylene (PTFE) composite with a thickness less than 1 mm. Therefore, the AIS antenna 140 can be bent to conform to the shape of curved surfaces, including body surfaces with compound curvature as commonly found on the vehicle 100. FIG. 6 is an image of the AIS antenna 140 mounted to the inside surface of a bumper fascia 160. The AIS antenna 140 can project its radiation pattern 146 through non-metal surfaces, such as the molded plastic typically used for the bumper fascia 160.

Because it can be located in a variety of inconspicuous locations in the vehicle 100, the AIS antenna 140 can be made large enough to yield very good angular resolution radar performance. The AIS antenna 140 can easily be constructed with a length of 200 mm or more, and a width of 100 mm or more. Furthermore, the aperture of the AIS antenna 140 is essentially its entire surface area. This extremely large aperture, in comparison to the typical construction of the radar sensors 102/104, gives the AIS antenna 140 very good angular resolution performance.

Other techniques for achieving high angular resolution exist—including using higher frequency radar chipsets, and increasing effective aperture size with more antennas and electronics. However, these other techniques are more costly than traditional radar, and do not offer the packaging convenience of the AIS antenna 140. In contrast, the AIS antenna 140 is less costly than traditional radar sensor antennas, and offers tremendous packaging flexibility.

As shown in FIG. 6, the AIS antenna 140 can be mounted to the interior of any non-metal vehicle body surface, such as the bumper fascia 160. In this configuration, the AIS antenna 140 transmits and receives radar signals through the body surface—which can be painted, including with metallic paint—but cannot be a solid metal surface. Other body surfaces suitable for interior mounting of the AIS antenna 140 include non-metal door panels, non-metal hoods and trunk lids, and body side moldings. The AIS antenna 140 can be mounted to body surfaces which are flat, or surfaces which have simple curvature (curvature about one axis) or compound curvature. The pattern of the AIS 144 can be designed to provide the desired far-field radiation pattern based on the curvature of the mounting surface, which becomes the curvature of the AIS antenna 140 after it is mounted.

The AIS antenna 140 can also be mounted to exterior surfaces of the vehicle 100—particularly to metal surfaces which are not conducive to interior mounting of the AIS antenna 140. The AIS antenna 140 is thin enough to be virtually unnoticeable on an exterior body surface if covered with a thin veneer or appliqué and then painted the same color as the vehicle exterior. Exterior mounting of the AIS antenna 140 may be appropriate on metal bumpers, and on hoods, deck lids and body panels in inconspicuous locations.

The AIS antenna 140 can also be made transparent and applied to the interior or exterior of glass surfaces on the vehicle 100. This is possible by making the substrate 148 and the patches 152 of materials which are optically transparent at visible wavelengths of light. For example, transparent AIS antennas have been demonstrated using substrate materials such as plastics and thin films of polyethylene terephthalate (PET). In a transparent design, the AIS antenna 140 can be mounted to the interior or exterior of glass components such as headlights, sunroofs and rear windows. The AIS antenna 140 can also be mounted to the interior or exterior of front windshields, in partially obscured areas such as the sun shade region, behind the rearview mirror, etc. The AIS antenna 140 can also be mounted to other transparent or semi-transparent surfaces which are not made of glass—such as tail lights. These mounting surface options further increase the flexibility of packaging the AIS antenna 140 in the vehicle 100.

Part of what makes the AIS antenna 140 work is the difference in dielectric constant between the materials on either side of the metal patches 152. As seen in FIGS. 3 and 4, those materials are air on the outside top surface ("above" the patches 152), and the dielectric layer 150 of the substrate 148 on the bottom surface ("below" the patches 152), with the ground plane 154 below that. Air at atmospheric pressure has a dielectric constant just slightly higher than 1.0 (less than 1.001), and the dielectric layer 150 has a dielectric constant of about 3.0. Other construction embodiments are also possible, as discussed below.

Figure 7:
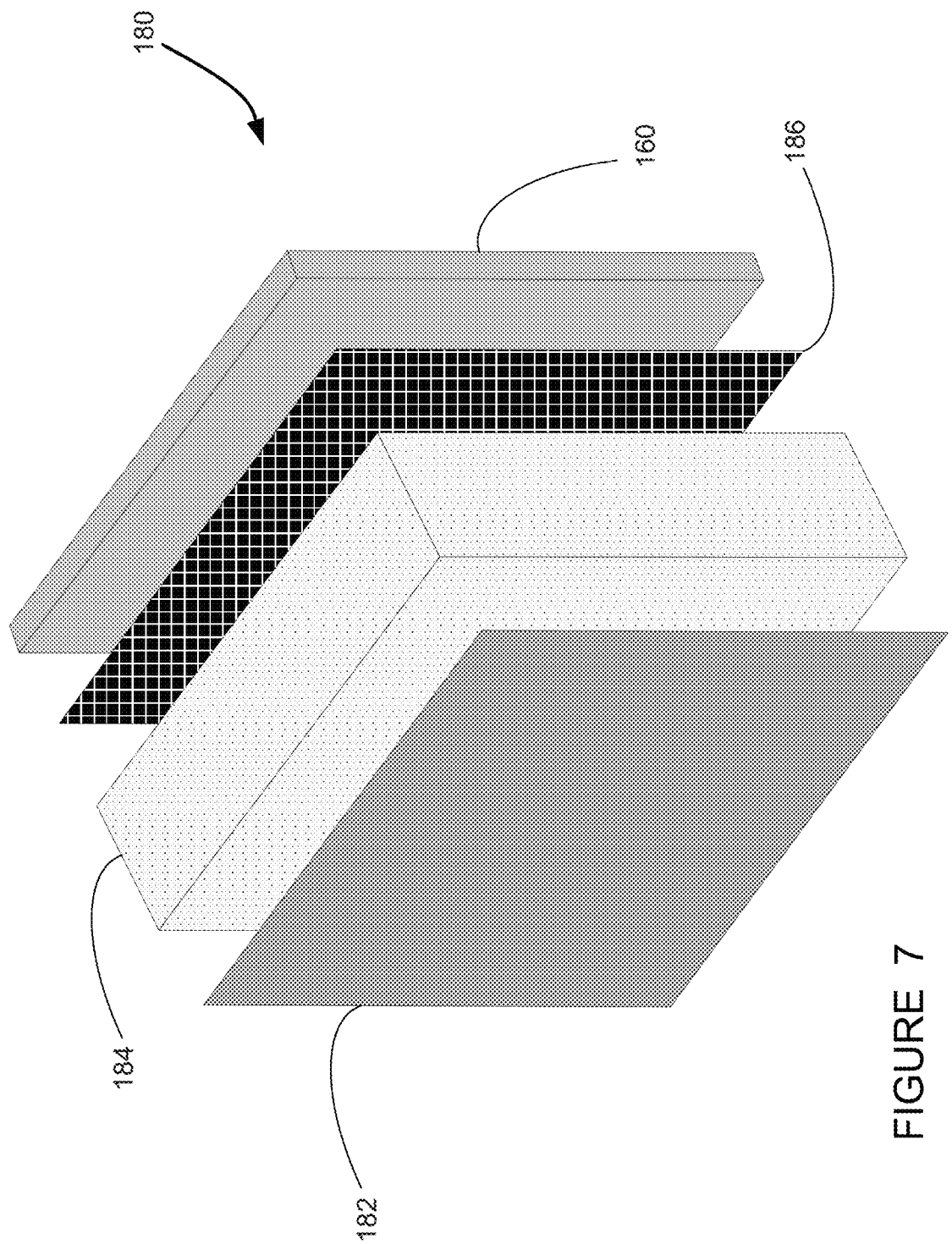
FIG. 7 is an illustration of a portion of an AIS antenna which uses an alternate construction technique.

FIG. 7 is an illustration of a portion of an AIS antenna 180 which uses an alternate construction technique. The AIS antenna 180 is intended to be mounted to the interior surface of a non-metal body panel, such as the fascia 160, where the fascia 160 actually becomes part of the functional design of the AIS antenna 180. The AIS antenna 180 includes a metallic ground plane 182, a foam layer 184, and a patch layer 186. The foam layer 184 is comprised of a low density foam or other material with a dielectric constant as close to 1.0 as possible. The purpose of the foam layer 184 is to provide separation of the patch layer 186 from the ground plane 182 and fill this space with a very low dielectric constant material acting as a substrate. The foam layer 184 should be at least 3 mm thick in order to provide the needed separation of the patch layer 186 from the ground plane 182.

The patch layer 186, instead of being printed on a substrate with a grounded dielectric layer as in the AIS antenna 140, is printed on a very thin layer of a polyimide material such as Kapton®, or PET. The material on which the patch layer 186 is printed, being only 1-2 mils (0.025-0.050 mm) in thickness, is so thin with respect to the wavelength of the electromagnetic radiation that it has very little impact on the radiation. The material of the fascia 160, on the opposite side of the patch layer 186 from the foam layer 184, has a higher dielectric constant (greater than 2.0) than the foam layer 184, and serves as a superstrate for the AIS antenna 180. The difference in the dielectric constant between the substrate (the foam layer 184) and the superstrate (the fascia 160) thus provides the conditions needed for the AIS antenna 180 to generate far-field radiation from surface waves applied to the patch layer 186.

The AIS antenna 180 would also include a semiconductor chip and surface-wave feeds (not shown) coupled to the patch layer 186, as described previously for the AIS antenna 140. The ground plane 182, the foam layer 184 and the patch layer 186 of the AIS antenna 180 can be stacked up in the order shown in FIG. 7 and bonded in any suitable fashion into a subassembly, which can be subsequently mounted to the interior surface of the fascia 160 before or during vehicle assembly. In some applications, because it takes advantage of the inherent presence of the fascia 160 and because of its use of different materials, the AIS antenna 180 can provide cost and/or performance advantages over the AIS antenna 140.

Using the techniques described above, automotive radar antennas can be created which are less expensive and easier to package in a vehicle than traditional radar sensors. At the same time, the artificial impedance surface antennas described above offer improved object detection performance due to their extremely large aperture size compared to existing sensors. These improvements in radar antenna design, in turn, enable better automotive collision avoidance capability, which is a benefit to both vehicle drivers and vehicle manufacturers.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An automotive radar antenna consisting essentially of:
   a semiconductor chip configured to perform active functions of the antenna including amplification, phase shifting and switching of electrical signals;
   an array of metallic patches arranged to create an impedance pattern which generates a desired far-field radiation pattern from surface waves which are launched across the array of metallic patches, where the surface waves are provided by the electrical signals from the semiconductor chip;
   a set of conductive strips connecting the semiconductor chip to the array of metallic patches, where the conductive strips feed the surface waves from the semiconductor chip to the array of metallic patches;
   a flexible substrate, where any material or air situated on an opposite side of the metallic patches from the substrate has a dielectric constant which differs from a dielectric constant of the substrate by at least 0.9; and
   a flexible metallic ground plane,
   where the antenna is mounted to a surface of a vehicle, and the array of metallic patches is designed to provide the desired far-field radiation pattern based on a shape of the antenna when mounted to the surface of the vehicle.

2. The antenna of claim 1 wherein the substrate includes a dielectric layer consisting of a material with a dielectric constant of 2.0 or higher, the metallic ground plane is applied to a bottom surface of the dielectric layer, and the array of metallic patches is applied to a top surface of the dielectric layer.

3. The antenna of claim 1 wherein the substrate consists of a material with a dielectric constant of 1.1 or lower, the array of metallic patches is applied to a polyimide material, and the antenna is mounted to an interior surface of an automotive body panel having a dielectric constant of 2.0 or higher.

4. The antenna of claim 3 wherein the array of metallic patches is situated between the body panel and the substrate, the metallic ground plane is situated on an opposite side of the substrate from the array of metallic patches, the polyimide material has a thickness of less than 0.05 millimeters (mm), and the substrate has a thickness of at least 3 mm.

5. The antenna of claim 1 wherein the surface of the vehicle and the shape of the antenna have a compound curvature.

6. The antenna of claim 1 wherein the antenna has an aperture size of at least 10,000 square millimeters (mm$^2$) and is mounted to an interior surface of a bumper fascia.

7. The antenna of claim 1 wherein the antenna is mounted to an exterior surface of an automotive body panel or structural component.

8. The antenna of claim 1 wherein the antenna is transparent and is mounted to an interior surface of a window, headlight or tail light.

9. The antenna of claim 1 wherein the antenna is transparent and is mounted to an exterior surface of a window, headlight or tail light.

10. The antenna of claim 1 wherein the antenna is part of an object detection radar system operating in a frequency range of 22-29 gigahertz (GHz) or 76-81 GHz.

11. The antenna of claim 10 wherein the object detection radar system provides object data to a collision avoidance system in the vehicle.

12. An automotive radar antenna consisting essentially of:
a semiconductor chip configured to perform active functions of the antenna including amplification, phase shifting and switching of electrical signals;
an array of metallic patches arranged to create an impedance pattern which generates a desired far-field radiation pattern from surface waves which are launched across the array of metallic patches, where the surface waves are provided by the electrical signals from the semiconductor chip;
a set of conductive strips connecting the semiconductor chip to the array of metallic patches, where the conductive strips feed surface waves from the semiconductor chip to the array of metallic patches; and
a flexible substrate including a dielectric layer consisting of a material with a dielectric constant of 2.0 or higher and a metallic ground plane applied to a bottom surface of the dielectric layer, where the array of metallic patches and the set of conductive strips are printed onto a top surface of the dielectric layer,
and where the antenna is mounted to a surface of a vehicle, where any material or air situated on an opposite side of the metallic patches from the substrate has a dielectric constant less than 1.1, and the array of metallic patches is designed to provide the desired far-field radiation pattern based on a shape of the antenna when mounted to the surface of the vehicle.

13. The antenna of claim 12 wherein the antenna is mounted to an interior or exterior surface of an automotive body panel or trim component.

14. The antenna of claim 12 wherein the antenna is transparent and is mounted to an interior or exterior surface of a window, headlight or tail light.

15. An automotive radar antenna consisting essentially of:
a semiconductor chip configured to perform active functions of the antenna including amplification, phase shifting and switching of electrical signals;
an array of metallic patches arranged to create an impedance pattern which generates a desired far-field radiation pattern from surface waves which are launched across the array of metallic patches, where the surface waves are provided by the electrical signals from the semiconductor chip;
a set of conductive strips connecting the semiconductor chip to the array of metallic patches, where the conductive strips feed the surface waves from the semiconductor chip to the array of metallic patches;
a flexible substrate;
a flexible metallic ground plane; and
an automotive body panel functioning as a superstrate, where the body panel has a dielectric constant which differs from a dielectric constant of the substrate by at least 0.9, and where a subassembly including the semiconductor chip, the array of metallic patches, the set of conductive strips, the substrate and the metallic ground plane is mounted to an interior surface of the body panel, and the array of metallic patches is designed to provide the desired far-field radiation pattern based on a shape of the antenna when mounted to the body panel.

16. The antenna of claim 15 wherein the substrate consists of a foam material with a dielectric constant of 1.1 or lower, the array of metallic patches is applied to a polyimide material, and the body panel has a dielectric constant of 2.0 or higher.

17. The antenna of claim 16 wherein the array of metallic patches is situated between the body panel and the substrate, the metallic ground plane is situated on an opposite side of the substrate from the array of metallic patches, the polyimide material has a thickness of less than 0.05 millimeters (mm), and the substrate has a thickness of at least 3 mm.

18. The antenna of claim 15 wherein the body panel and the shape of the antenna have a compound curvature.

19. The antenna of claim 15 wherein the antenna is part of an object detection radar system operating in a frequency range of 22-29 gigahertz (GHz) or 76-81 GHz, and the object detection radar system provides object data to a collision avoidance system in a vehicle.

* * * * *